though which the fruit juice is passed.

UNITED STATES PATENT OFFICE 2,437,104

FOOD PRODUCT AND PROCESS OF PRODUCING SAME

Royal Lee, Milwaukee, Wis., assignor to Lee Foundation for Nutritional Research, Milwaukee, Wis., a corporation of Wisconsin No Drawing. Application September 4, 1943, Serial No. 501,281

6 Claims. (Cl. 99—206)

The present invention relates to food products and to a process of producing the same.

It has been found difficult to provide a satisfactory dried fruit juice product, such as from lemon juice and lime juice, because of the tendency of the juice to become sticky and gummy in the final drying stages, and also because of the extremely hygroscopic nature of the product. To permit drying of the juice to a powdered form, as by spray-drying, it has been customary to add to the juice a suitable sugar material, such as corn sugar with dextrin, in a substantial amount several times as large as the amount of juice solids, but even with this treated juice it has been necessary to use a relatively high drying temperature, which alters the natural flavor and results in destruction of vitamins.

An object of the invention is to provide an improved process of treating an acid fruit juice and the like which comprises mixing with the juice a calcium compound of phytic acid, whereby to permit expeditious dehydration of the juice to form a non-hygroscopic dried product which will retain to a large extent the flavor, aroma and vitamins of the natural juice, the dried product further having a substantial content of soluble and readily assimilable calcium.

Another object is to provide an edible product in which phytin or other calcium-bearing phytate is associated with citric or malic acid, the calcium content being rendered soluble and readily assimilable.

The invention further consists in the several features hereinafter described and claimed.

In accordance with the invention, an acid food juice, such as lemon juice, is treated by mixing therewith a suitable quantity of a calcium compound of phytic acid, also known as inositol phosphoric acid. The compound used is preferably the natural calcium-magnesium salt known as phytin, but other calcium-bearing phytates may also be used, particularly those containing a larger proportion of calcium. One of the latter phytates has ascribed to it the formula

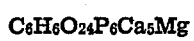

$C_6H_6O_{24}P_6Ca_5Mg$

The calcium-bearing phytate is insoluble or only slightly soluble in water but is readily soluble in the lemon juice which contains citric acid. A sufficient amount of phytate is added to make an approximately saturated solution, although an excess of phytate may be provided in some instances. The amount by weight of the added phytate usually ranges from 60 to 100% of the amount of citric acid present.

The treated juice is then dried, as by means of a spray or roller dryer, with or without a vacuum, and preferably out of contact with oxygen. The drying temperature preferably does not exceed 140° F., and the juice solids ordinarily remain at a somewhat lower temperature because of the refrigerating effect accompanying evaporation. The juice dries readily without forming a sticky or gummy mass, and the resulting product is non-hygroscopic and is normally in the form of a powder. The dried product retains the natural flavor and aroma of the juice, and also the nutritive and vitamin values. In addition, the product contains a substantial amount of calcium, contributed by the phytate, and this calcium is rendered soluble and readily assimilable by its association with the dried acid juice. The phytate also provides phosphorus and magnesium, and in some cases other minerals. In the case of lemon juice, the phytate may constitute about one-third of the dried product. The dried product may be readily dissolved in water to reconstitute the treated juice, or it may be added to or incorporated in other foodstuffs. The phytate is practically tasteless and odorless and is stable and relatively non-hygroscopic.

Suitable sources of phytin are cereal grains, such as wheat, rice, and barley, and preferably the bran and germ thereof. If germ is used it is first defatted. Preferably, the bran and germ are extracted with water to remove the water-soluble constituents. The material is then suitably treated to remove the phytin. One mode of treatment consists in applying the fruit juice directly to the phytin-bearing material to dissolve the phytin. In this process the phytin-bearing material may be in the form of a filter bed through which the fruit juice is passed. According to another mode of treatment, the phytin-bearing material is extracted with a dilute hydrochloric acid solution, say a 1% solution, and the phytin is precipitated therefrom by neutralizing the solution with a suitable alkaline substance, such as sodium bicarbonate. The recovered phytin is then added to the acid fruit juice.

The treatment of the invention is particularly suitable for high-acid low-sugar citrus fruit juices, such as lemon juice and lime juice, but other citrus fruit juices, such as orange juice and grapefruit juice, may also be treated in accordance with the invention.

In cases where a sweetened dried juice product is desired, a suitable amount of sugar may be added, either before or after drying.

The invention is also applicable to the treatment of a fruit juice, such as green apple juice, containing malic acid. Phytin or other calcium-bearing phytate is dissolved in the juice to form an approximately saturated solution permitting easy drying of the juice to a non-hygroscopic powder. The resulting product contains a substantial amount of soluble and readily assimilable calcium. Pineapple juice, which contains citric and malic acid, may be treated in a similar manner to facilitate drying of the juice to a powder.

Certain advantages of the invention can also be realized by providing dry edible compositions comprising citric and/or malic acid and a calcium-bearing phytate. Such compositions can be used in various ways, as for addition to foodstuffs and in preparing beverages in which the acid flavor is desired or compatible, and will provide a source of soluble and readily assimilable calcium. A suitable composition consists of 55 to 60 parts of the acid and 40 to 45 parts of phytate, the proportions being by weight. In some instances, other substances may be added, such as sugar for sweetening.

What I claim as new and desire to secure by Letters Patent is:

1. A process for producing a dry, water-soluble, fruit juice concentrate, which comprises admixing a calcium-bearing phytate in a fruit juice containing an organic acid of the class consisting of citric and malic acids to form a liquid solution, the proportions of phytate and acid of the juice being of the same order of magnitude and said phytate and juice solids constituting essentially the entire portion of the solids in the solution, and dehydrating the liquid so formed into a dry, relatively non-hygroscopic, water-soluble product.

2. A process comprising extracting phytin from seed material with a fruit juice containing an organic acid of the class consisting of citric and malic acids, separating the phytin-bearing liquid so formed from the residue of the seed material, and dehydrating the liquid to form a dry, relatively non-hygroscopic, water-soluble product.

3. A dry, water-soluble, food composition, consisting essentially of a calcium-bearing phytate admixed with an organic acid selected from the class consisting of citric and malic acids, said phytate and acid being present in amounts which are of the same order of magnitude.

4. A dry, water-soluble, fruit juice concentrate, consisting essentially of the dehydrated constituents of a solution of a calcium-bearing phytate in an acid fruit juice containing an organic acid selected from the class consisting of citric and malic acids, the proportions of said phytate and acid being of the same order of magnitude.

5. A dry, water-soluble, lemon juice concentrate, comprising the dehydrated constituents of a solution of a calcium-bearing phytate in lemon juice, said phytate constituting approximately one-third of the dry concentrate.

6. A dry, water-soluble, apple juice concentrate, consisting essentially of the dehydrated constituents of a solution of a calcium-bearing phytate in apple juice, the proportions of said phytate and acid of the juice being of the same order of magnitude.

ROYAL LEE.

REFERENCES CITED

The following references are of record in the file of this patent:

UNITED STATES PATENTS

| Number | Name | Date |
|---|---|---|
| 761,666 | Fleming | June 7, 1904 |
| 2,094,023 | Pollak | Sept. 28, 1937 |